US011292911B2

United States Patent
Waßmer et al.

(10) Patent No.: US 11,292,911 B2
(45) Date of Patent: Apr. 5, 2022

(54) AQUEOUS, STORAGE-STABLE COMPOSITION CONTAINING N-BENZYL-SUBSTITUTED N-(2-AMINOETHYL)-3-AMINOPROPYLSILOXANE HYDROCHLORIDES, PROCESSES FOR PRODUCTION THEREOF AND USE THEREOF

(71) Applicant: Evonik Operations GmbH, Essen (DE)

(72) Inventors: Christian Waßmer, Hausen (DE); Tim Biggs, Rheinfelden (DE); Julian Asal, Rheinfelden (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/268,874

(22) PCT Filed: Aug. 12, 2019

(86) PCT No.: PCT/EP2019/071537
§ 371 (c)(1),
(2) Date: Feb. 16, 2021

(87) PCT Pub. No.: WO2020/035432
PCT Pub. Date: Feb. 20, 2020

(65) Prior Publication Data
US 2021/0246313 A1  Aug. 12, 2021

(30) Foreign Application Priority Data
Aug. 17, 2018  (EP) .................................... 18189502

(51) Int. Cl.
| C08G 77/26 | (2006.01) |
| C08L 83/08 | (2006.01) |
| C07F 7/18 | (2006.01) |
| C07F 7/20 | (2006.01) |
| C08G 77/388 | (2006.01) |
| C09D 183/08 | (2006.01) |
| C09J 183/04 | (2006.01) |

(52) U.S. Cl.
CPC ............ *C08L 83/08* (2013.01); *C07F 7/1804* (2013.01); *C07F 7/1892* (2013.01); *C07F 7/20* (2013.01); *C08G 77/26* (2013.01); *C08G 77/388* (2013.01); *C09D 183/08* (2013.01); *C09J 183/04* (2013.01)

(58) Field of Classification Search
CPC ....... C08G 77/26; C09D 183/08; C09J 183/04
See application file for complete search history.

(56) References Cited

U.S. PATENT DOCUMENTS

| 4,330,444 A | 5/1982 | Pollman |
| 4,382,991 A | 5/1983 | Pollman |
| 4,499,152 A | 2/1985 | Green et al. |
| 4,849,294 A | 7/1989 | Plueddemann |
| 4,902,556 A | 2/1990 | Benedikt et al. |
| 5,591,818 A | 1/1997 | Standke et al. |
| 5,629,400 A * | 5/1997 | Standke ............... C09D 183/08 528/38 |
| 5,679,147 A | 10/1997 | Standke et al. |
| 5,885,341 A | 3/1999 | Standke et al. |
| 6,255,513 B1 | 7/2001 | Standke et al. |
| 6,534,667 B1 | 3/2003 | Standke et al. |
| 2019/0112323 A1 | 4/2019 | Standke et al. |

FOREIGN PATENT DOCUMENTS

| BE | 845040 | 2/1977 |
| CA | 10768266 | 5/1980 |
| CN | 101353480 A | 1/2009 |
| DE | 28 02 242 A1 | 7/1978 |
| DE | 10 2004 001 368 A1 | 8/2005 |
| EP | 0 176 062 | 4/1986 |
| EP | 0 338 128 | 10/1989 |
| EP | 0 353 766 | 2/1990 |
| EP | 0 590 270 | 4/1994 |
| EP | 0 716 127 | 6/1996 |
| EP | 0 832 911 | 9/2000 |
| EP | 0 953 591 | 10/2001 |
| EP | 0 675 128 | 12/2001 |
| EP | 0 716 128 | 12/2002 |
| EP | 1 031 593 | 10/2003 |
| EP | 1 773 917 | 12/2011 |
| JP | 62-243624 | 10/1987 |
| JP | 1-259369 | 10/1989 |
| JP | 7-258415 | 10/1995 |
| JP | 2000-230148 | 8/2000 |
| WO | 88/00527 | 1/1988 |
| WO | 2005/118599 A1 | 12/2005 |

OTHER PUBLICATIONS

International Search Report dated Aug. 30, 2019 in PCT/EP2019/071537.
Written Opinion dated Aug. 30, 2019 in PCT/EP2019/071537.
Edwin P. Plueddemann, "*Silanols and Siloxanes as Coupling Agents and Primers*", 39th Annual Conference, Reinforced Plastics/Composites Institute, The Society of the Plastic Industry, Inc., Jan. 16-19, 1984, Session 4-C, pp. 1-4.

\* cited by examiner

*Primary Examiner* — Margaret G Moore
(74) *Attorney, Agent, or Firm* — Grüneberg and Myers PLLC

(57) ABSTRACT

An aqueous composition contains N-benzyl-substituted N-(2-aminoethyl)-3-aminopropylsiloxane hydrochlorides, wherein the composition after storage for 6 weeks at 60° C. has a color number of ≤1 Gardner, a content of methanol of ≤0.5% by weight, an active substance content of ≤60% by weight, and a content of water of ≥40% to ≤60% by weight, and wherein the components in the composition sum to 100% by weight.

20 Claims, No Drawings

US 11,292,911 B2

AQUEOUS, STORAGE-STABLE COMPOSITION CONTAINING N-BENZYL-SUBSTITUTED N-(2-AMINOETHYL)-3-AMINOPROPYLSILOXANE HYDROCHLORIDES, PROCESSES FOR PRODUCTION THEREOF AND USE THEREOF

CROSS-REFERENCE TO RELATED APPLICATIONS

This application is the National Stage entry under § 371 of International Application No. PCT/EP 2019/071537, filed on Aug. 12, 2019, and which claims the benefit of European Application No. 18189502.0, filed on Aug. 17, 2018. The content of each of these applications is hereby incorporated by reference in its entirety.

BACKGROUND OF THE INVENTION

Field of the Invention

The present invention relates to an aqueous, low-VOC, storage-stable composition containing N-benzyl-substituted N-(2-aminoethyl)-3-aminopropylsiloxane hydrochlorides, to processes for providing such a composition and to the use thereof.

Description of Related Art

It has long been known to produce aqueous hydrolysates/condensates from alkoxysilanes, in particular based on aminoalkylalkoxysilanes (inter alia EP 0 675 128 B1, EP 0 716 127 A2, EP 0 716 128 B1, EP 0 832 911 B1, EP 0 953 591 B1, EP 1 031 593 B1, EP 1 773 917 B1).

EP 0 590 270 A2 and WO 2005/118599 A1 disclose compositions and processes for producing alcoholic solutions of organosilane polycondensates. According to EP 0 590 270 A2, aqueous solutions of N—(N-benzyl-2-aminoethyl)-3-aminopropyltrimethoxysilane hydrochloride are unstable; addition of water results in an inhomogeneous cloudy solution.

It is known to produce a water-soluble hydrolysate from N—(N-benzyl-2-aminoethyl)-3-aminopropyltrimethoxysilane by addition of acetic acid and removal of methanol fractions, cf. example 7 in EP 0 716 127 A2, and to use it as an adhesion promoter for example.

N—(N-Vinylbenzyl-2-aminoethyl)-3-aminopropyltrimethoxysilane hydrochloride is likewise known, inter alia from Plueddemann, 39th Annual Conference, Reinforced Plastics/Composites Institute, The Society of the Plastic Industry, Inc. Jan. 16-19, 1984, Session 4-C, Pages 1-4; U.S. Pat. Nos. 4,902,556, 4,849,294, 4,382,991, 4,330,444, DE 28 02 242, JP 2000-230148 A2, EP 0 338 128, EP 0 353 766.

Aqueous, low-VOC, ideally colourless and storage-stable products having the highest possible active substance content are increasingly demanded for many applications.

SUMMARY OF THE INVENTION

It was accordingly an objective of the invention to provide an ideally colourless and storage-stable, especially precipitation-free at elevated storage temperatures, low-VOC, aqueous composition having the highest possible active substance content based on N—(N-benzyl-2-aminoethyl)-3-aminopropyl-trimethoxysilane hydrochloride and a content of free methanol of ≤0.5% by weight.

The objective is achieved in accordance with the invention according to the features described below.

DETAILED DESCRIPTION OF THE INVENTION

It was thus surprisingly found that it is advantageously possible to provide an aqueous, low-VOC composition having an advantageously high active substance proportion of up to 60% by weight, i.e. N-benzyl-substituted N-(2-aminoethyl)-3-aminopropylsiloxane hydrochlorides [here and hereinbelow also active substance for short], which is substantially methanol-free, i.e. has a content of methanol of ≤0.5% by weight, and is storage-stable for at least 1 year at room temperature. Present compositions moreover show no precipitation even at relatively high storage temperatures, are clear and—if required—are advantageously dilutable with water in practically any ratio. Present compositions are further substantially colourless having a colour number of ≤1 Gardner. Present compositions are moreover low-VOC compositions since they are practically completely hydrolysed, i.e. the active substances present therein, N-benzyl-substituted N-(2-aminoethyl)-3-aminopropylsiloxane hydrochlorides, essentially no longer comprise any methoxy groups according to chemical understanding.

Production of the present composition is advantageously achieved according to the following process variants A and B:

Process variant A can thus advantageously comprise
in step 1 performing a controlled hydrolysis of N-(2-aminoethyl)-3-aminopropyltrimethoxysilane with 1.15 to 1.25 mol of water per mole of Si, preferably 1.2 mol of water per mole of Si, at a bottoms temperature of from room temperature to 60° C. in the presence of 25% to 30% by weight of methanol, preferably 27% by weight of methanol, based on the present input materials N-(2-aminoethyl)-3-aminopropyltrimethoxysilane and water, immediately thereafter in step 2 reacting the hydrolysate obtained in step 1 with benzyl chloride, preferably 1 mol of benzyl chloride per mole of N-(2-aminoethyl)-3-aminopropyltrimethoxysilane, at a bottoms temperature of 58° C. to 60° C. and subsequently adding concentrated hydrochloric acid, preferably 0.9 to 1.0 mol of HCl per mole of Si, and subsequently in step 3 distillatively removing methanol and any fractions likewise volatile under the distillation conditions from the product mixture obtained in step 2 under reduced pressure and with addition of a defined amount of water, preferably 1.35 g of water per 1.0 g of the silane employed in step 1, preferably at an absolute pressure of 303 mbar to 111 mbar and a bottoms temperature of 43° C. to 51° C., wherein water is simultaneously added to the distillation bottoms up to such an amount as volatile fractions are discharged overhead.

Process variant B can advantageously comprise
initially charging an N—(N-benzyl-2-aminoethyl)-3-aminopropyltrimethoxysilane hydrochloride-containing methanolic solution, adding concentrated hydrochloric acid in a weight ratio of N—(N-benzyl-2-aminoethyl)-3-aminopropyltrimethoxysilane hydrochloride to concentrated hydrochloric acid of 4 to 2:1, preferably 3.8:1, at a temperature of from room temperature to 60° C. over 20 to 40 minutes with commixing and then quickly adding water in an amount of 1 to 2 mol of water per mole of N—(N-benzyl-2-aminoethyl)-3-aminopropyltrimethoxysilane hydrochloride over 1 to 5 minutes with commixing before distillatively removing volatile fractions from the product mixture at a bottoms temperature of 40° C. to 55° C. and a reduced pressure of 280 to 120 mbar, wherein water is simultaneously added to the distillation bottoms up to such an amount as volatile fractions are discharged overhead.

Compositions obtained according to the process variants A or B are suitably obtained as the bottoms product in the distillation unit and constitute an aqueous, low-VOC composition having an active substance content of ≤60% by weight, for example ≥40% to 60% by weight or 45% to 60% by weight, merely by way of example, at a content of water of ≥40% by weight, preferably of ≥40% to ≤60% by weight, and a content of methanol of ≤0.5% by weight, wherein the components in the composition sum to 100% by weight. Thus obtained compositions further advantageously have a viscosity of ≥50 to ≤300 mPas (at 20° C.), a pH of ≥2 to ≤4 and a colour number of ≤1 Gardner, are moreover clear, storage-stable for at least 1 year at room temperature and are miscible with water in practically any ratio. Thus obtained compositions moreover show practically no precipitation even at elevated storage temperatures.

The present invention accordingly provides an aqueous composition containing N-benzyl-substituted N-(2-aminoethyl)-3-aminopropylsiloxane hydrochlorides, wherein the composition after storage for 6 weeks at 60° C. has a colour number of ≤1 Gardner [ISO 6274], a content of methanol of <0.5% by weight and an active substance content of ≤60% by weight at a content of water of ≥40% to ≤60% by weight, wherein the components in the composition sum to 100% by weight.

Compositions according to the invention moreover advantageously have the feature that they are storage-stable for at least 12 months at room temperature and have a colour number of ≤1 Gardner, a viscosity of ≥50 to ≤300 mPas (at 20° C.) and a pH of ≥2 to ≤4.

Compositions according to the invention advantageously contain as the so-called active substance N-benzyl-substituted N-(2-aminoethyl)-3-aminopropylsiloxane hydrochlorides as a mixture of isomeric N-benzyl-substituted N-(2-aminoethyl)-3-aminopropylsiloxanes, wherein at least one of the isomeric N-benzyl-substituted N-(2-aminoethyl)-3-aminopropylsiloxanes conforms to formula I

$$HO_{(1-y)}(RO)_y[(A)SiO(OH)_{(1-z)}(OR)_z]_x—R \quad (I),$$

wherein R represents methyl or ethyl, x≥1 and y=0 or 1 and z=0 or 1 with the proviso that (y+z)≤1 and A represents an aminoalkyl group according to formula II

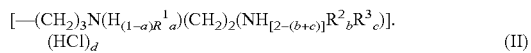

$$[—(CH_2)_3N(H_{(1-a)}R^1{}_a)(CH_2)_2(NH_{[2-(b+c)]}R^2{}_bR^3{}_c)]·(HCl)_d \quad (II)$$

where a=0 or 1 and b=0 and/or 1 or c=0 or 1 with the proviso that (b+c)=0 or 1 or 2, wherein groups $R^1$, $R^2$ and $R^3$ represent benzyl and d=0 or 1 or 2 or 3.

By way of example—but not exclusively—compositions according to the invention may have a distribution of the active substances/oligomers.

| Compounds according to formula I and II where | Mol % |
|---|---|
| Type A: a = 0, b = 0, c = 0 | 37.4 |
| Type B: a = 1, b = 0, c = 0 | 18.8 |
| Type C: a = 0, b = 0, c = 1 | 18.9 |
| Type D: a = 1, b = 0, c = 1 | 8.4 |
| Type E: a = 0, b = 1, c = 1 | 4.8 |
| Type F: a = 1, b = 1, c = 1 | 11.7 |

Thus by way of example—but not exclusively—a composition according to the invention may preferably contain 40% to 60% by weight of water and active substance in an active substance distribution of 37.4 mol % of type A, 18.8 mol % of type B, 18.9 mol % of type C, 8.4 mol % of type D, 4.8 mol % of type E and 11.7 mol % of type F, wherein all components of the composition sum to 100% by weight.

The present invention further provides a process for producing a composition according to the invention which in process variant A comprises in step 1 performing a controlled hydrolysis of N-(2-aminoethyl)-3-aminopropyltrimethoxysilane with 1.15 to 1.25 mol of water per mole of Si, preferably 1.2 mol of water per mole of Si, at a bottoms temperature of from room temperature to 60° C. in the presence of 25% to 30% by weight of methanol, preferably 27% by weight of methanol, based on the present input materials N-(2-aminoethyl)-3-aminopropyltrimethoxysilane and water, immediately thereafter in step 2 reacting the hydrolysate obtained in step 1 with benzyl chloride, preferably 1 mol of benzyl chloride per mole of N-(2-aminoethyl)-3-aminopropyltrimethoxysilane, at a bottoms temperature of 58° C. to 60° C. and subsequently adding concentrated hydrochloric acid, preferably 0.9 to 1.0 mol of HCl per mole of Si, and subsequently in step 3 distillatively removing methanol and any fractions likewise volatile under the distillation conditions from the product mixture obtained in step 2 under reduced pressure and with addition of defined amounts of water, preferably 1.35 g of water per 1.0 g of the silane employed in step 1, preferably at an absolute pressure of 303 mbar to 111 mbar and a bottoms temperature of 43° C. to 51° C., wherein water is simultaneously added to the distillation bottoms up to such an amount as volatile fractions are discharged overhead or in process variant B comprises initially charging an N—(N-benzyl-2-aminoethyl)-3-aminopropyltrimethoxysilane hydrochloride-containing methanolic solution, adding concentrated hydrochloric acid in a weight ratio of N—(N-benzyl-2-aminoethyl)-3-aminopropyltrimethoxysilane hydrochloride to concentrated hydrochloric acid of 4 to 2:1, preferably 3.8:1, at a temperature of from room temperature to 60° C. over 20 to 40 minutes with commixing and then quickly adding water in an amount of 1 to 2 mol of water per mole of N—(N-benzyl-2-aminoethyl)-3-aminopropyltrimethoxysilane hydrochloride over 1 to 5 minutes with commixing before distillatively removing volatile fractions from the product mixture at a bottoms temperature of 40° C. to 55° C. and a reduced pressure of 280 to 120 mbar, wherein water is simultaneously added to the distillation bottoms up to such an amount as volatile fractions are discharged overhead, to obtain in process variants A or B in the bottom of the distillation unit an aqueous, low-VOC composition having an active substance content of ≤60% by weight at a content of water of ≥40% to ≤60% by weight and a content of methanol of ≤0.5% by weight, wherein the components in the composition sum to 100% by weight and the composition has a viscosity of ≥50 to ≤300 mPas (at 20° C.), a pH of ≥2 to ≤4 and a colour number of ≤1 Gardner and is storage-stable for at least 1 year at room temperature.

Thus, the present invention likewise provides an aqueous composition obtainable or obtained by the process according to the invention.

In general, the process according to the invention may be performed as follows:

Apparatuses suitably employed to perform the present process are a distillation or rectification unit which comprises by way of example—but not exclusively—a heatable/coolable tank fitted with a stirring apparatus and a means for temperature monitoring/control, an attached separating column, optionally comprising packing, a reflux divider and a reservoir vessel, a rotary vane oil pump and a means for pressure measuring/control including a cold trap. Process variants A and B specified hereinabove may advantageously be performed in such a reaction apparatus. Reference is moreover made to the inventive exemplary embodiments which follow.

Compositions according to the invention and products and solutions produced/obtained according to the invention are advantageously suitable as adhesion promoters, for modifying fillers, pigments and/or inorganic surfaces, in particular for filler coating, coating of pigments, coating of inorganic surfaces, as an additive in polymers, in adhesives, in sealing compositions, in fibre composite materials, together with polymers, in particular thermoplastics, thermosets, elastomers, for functionalizing polymers, for adjusting the hydrophilicity of polymers, for functionalizing glass, in particular for functionalizing glass fibres and as a constituent of an aqueous size for glass fibre applications including without addition of a hydrolysis catalyst.

The advantageous application/use possibilities recited hereinabove of a composition according to the invention likewise form part of the subject matter of the present invention.

The present invention is elucidated in more detail by the examples which follow, without limiting the subject matter.

EXAMPLES

Input Materials

| | |
|---|---|
| Benzyl chloride | chloromethyl benzene, Ineos |
| Dynasylan ®DAMO | N-(2-aminoethyl)-3-aminopropyltrimethoxysilane, Resource Efficiency |
| Dynasylan ®1160 | N-(N-benzyl-2-aminoethyl)-3-aminopropyltrimethoxysilane (50% by weight in methanol), Resource Efficiency |
| Dynasylan ®1161EQ | N-(N-benzyl-2-aminoethyl)-3-aminopropyltrimethoxysilane hydrochloride (50% by weight active substance in methanol), Resource Efficiency |
| Water | DM water |
| Conc. HCl | concentrated hydrochloric acid (w = 34.8%), Roth |
| Glacial acetic acid | concentrated acetic acid (w > 98%), Roth |
| Methanol | ultrahigh purity methanol, w > 99% |

Analytical Methods $^{13}$C-NMR- and $^{1}$H-NMR-determination was carried out using a "400 MHz Bruker NMR" apparatus, the solvent employed was CDCl$_3$.

Determination of the colour numbers [Gardner] was carried out according to ISO 6274.

Refractive indices were determined according to DIN 51423 and densities according to DIN 51757.

Determination of the content of free methanol in the composition was carried out according to SAA 1844.

Viscosity reported in mPas was determined at 20° C. according to DIN 53015.

Density determination at 20° C. and reported in [g/cm$^3$] was carried out according to DIN 51757.

Refractive index was determined according to DIN 51423.

pH was determined according to DIN 38409-H-1.

Testing of storage stability was performed under accelerated conditions at 60° C. To this end, the liquid to be tested was stored in a glass bottle (gas space inertized with nitrogen) in a circulating air drying cabinet in the absence of light. Increasing the storage temperature by 10 K in each case simulates the doubling of the storage time. After storage, the sample was assessed and investigated for analytically detectable changes such as for example colour number.

Comparative Example 1: (As Per Example 7 from EP 0 716 127 A2)

Apparatus: 1 litre four-necked flask fitted with distillation bridge, dropping funnel, KPG stirrer, bottoms thermometer, oil bath with temperature control, rotary vane vacuum pump, manometer. 446.7 g of Dynasylan® 1161 EQ were initially charged and at RT a mixture of 25.0 g of DM water and 49.5 g of glacial acetic acid were added dropwise. The bottoms temperature increased to 38.5° C. The hydrolysate was subsequently diluted with 375.0 g of DM water. At an absolute pressure of 301 mbar to 250 mbar, altogether 370.6 g of distillate were removed. DM water was added during the distillation. Yield: 758.1 g of yellow liquid having an active substance content of 28.8%.

Analytical Results

| Determination | Result | Method |
|---|---|---|
| Free methanol [% by weight] | 2.7 | SAA 1844 |
| Colour number [Gardner] | 1 | ISO 6274 |

-continued

| Determination | Result | Method |
| --- | --- | --- |
| Viscosity 20° C. [mPas] | 7.1 | DIN 53015 |
| Density (20° C.) [g/cm³] | 1.071 | DIN 51757 |
| Refractive index | 1.3931 | DIN 51423 |
| pH | 4.6 | DIN 38409-H-1 |

After one day of storage at 50° C. the product exhibited precipitation and sediment. When the product produced according to comparative example 1 was diluted with water, for example 0.5% to 2% by weight of product in DM water, the system became milky/cloudy after only 1 hour.

Comparative Example 2: (As Per Example 2 From EP 0 590 270 A2)

A composition produced according to example 2 from EP 0 590 270 A2 has a content of methanol of 59.9% by weight.

Comparative Example 3: (As Per Example 4 From EP 0 590 270 A2)

A composition produced according to the teaching of example 4 from EP 0 590 270 A2 also has a content of methanol of 59.9% by weight.

Example 1

Apparatus: 15 litre double-walled laboratory reactor fitted with metering pump, distillation bridge, KPG stirrer, bottoms thermometer, rotary vane vacuum pump, manometer, oil thermostat with temperature control means.
7724.7 g of Dynasylan® 1161 EQ (50% active substance content in methanol) were initially charged and 1160.4 g of hydrochloric acid (w=34.8%) were added to the Dynasylan® 1161 EQ over 26 minutes with stirring. The temperature increased to 51.6° C. 3892.1 g of water were then added over 2 minutes. At a bottoms temperature of 41° C. to 53° C. and an absolute pressure of 272 mbar to 141 mbar, altogether 8759.8 g of distillate were removed. DM water was added during the distillation. Yield: 6436 g of clear yellowish liquid having an active substance content of 60% by weight.
The product was storage-stable for >8 weeks at 60° C.

Analytical Results

| Determination | Result | Method |
| --- | --- | --- |
| Free methanol [% by weight] | 0.1 | SAA 1844 |
| Colour number [Gardner] | <1 | ISO 6274 |
| Viscosity 20° C. [mPas] | 163 | DIN 53015 |
| Density (20° C.) [g/cm³] | 1.169 | DIN 51757 |
| Refractive index | 1.4620 | DIN 51423 |
| pH (10% in H₂O) | 2.8 | DIN 38409-H-1 |

Colour number: <1 Gardner after production
<1 Gardner after 8 weeks of storage at 60° C.

Furthermore, with regard to possible aqueous applications, for example for special primer applications, a composition obtained according to example 1 is advantageously virtually freely dilutable with water without any clouding.

Example 2

Apparatus: 4 litre four-necked flask fitted with distillation bridge, dropping funnel, KPG stirrer, bottoms thermometer, oil bath with temperature control, rotary vane vacuum pump, manometer. 889.6 g of Dynasylan® DAMO were initially charged at room temperature and 368.0 g of methanol were stirred in. The bottoms temperature increased from 21° C. to 37° C. 86.4 g of DM water were then added over 5 minutes and the mixture was stirred at 50° C. for a further 30 minutes. At a bottoms temperature of 58° C. to 60° C., 506.4 g of benzyl chloride were added dropwise over 2.7 hours and the mixture was stirred at 58° C. to 60° C. for a further 5 hours. Analysis of the bottoms sample showed a content of free benzyl chloride of <0.1% by weight. 228.7 g of conc. hydrochloric acid (w=37%) were added dropwise over 30 minutes. The reaction mixture was then diluted with 1200 g of DM water. At a bottoms temperature of 43° C. to 51° C. and an absolute pressure of 300 mbar to 111 mbar, altogether 2075 g of distillate were removed. DM water was added during the distillation. Yield: 2321 g of clear yellowish liquid having an active substance content of 60% by weight. The product was storage-stable for >14.5 weeks at 60° C.

Analytical Results

| Determination | Result | Method |
| --- | --- | --- |
| Free methanol [% by weight] | <0.1 | SAA 1844 |
| Colour number [Gardner] | 1 | ISO 6274 |
| Viscosity 20° C. [mPas] | 236 | DIN 53015 |
| Density (20° C.) [g/cm³] | 1.165 | DIN 51757 |
| Refractive index | 1.4601 | DIN 51423 |
| pH (10% in H₂O) | 3.2 | DIN 38409-H-1 |

Example 3

Apparatus: 4 litre four-necked flask fitted with distillation bridge, dropping funnel, KPG stirrer, bottoms thermometer, oil bath with temperature control, rotary vane vacuum pump, manometer. 1112 g of Dynasylan® DAMO were initially charged at room temperature and 460 g of methanol were stirred in. The bottoms temperature increased from 21° C. to 38° C. Subsequently at a bottoms temperature of 58° C. to 60° C., 633 g of benzyl chloride were added dropwise over 1.25 hours and the mixture was stirred at 58° C. to 60° C. for a further 3 hours. Analysis of the bottoms sample showed a content of free benzyl chloride of <0.1% by weight. At a bottoms temperature of 39° C., 456.3 g of conc. hydrochloric acid (w=37%) were added dropwise over 21 minutes. At a bottoms temperature of 40° C. to 57° C. and an absolute pressure of 250 mbar to 180 mbar, altogether 1570.1 g of distillate were removed. DM water was added during the distillation. Yield: 2891.4 g of clear yellowish liquid having an active substance content of 60% by weight. The product was storage-stable for >10 weeks at 60° C.

Analytical Results

| Determination | Result | Method |
| --- | --- | --- |
| Free methanol [%] | 0.4 | SAA 1844 |
| Colour number [Gardner] | <1 | ISO 6274 |
| Viscosity 20° C. [mPas] | 186 | DIN 53015 |
| Density (20° C.) [g/cm³] | 1.167 | DIN 51757 |
| Refractive index | 1.462 | DIN 51423 |
| pH (10% in H₂O) | 3.3 | DIN 38409-H-1 |

Example 4

Apparatus: 15 litre double-walled laboratory reactor fitted with metering pump, distillation bridge, KPG stirrer, bottoms thermometer, rotary vane vacuum pump, manometer, oil thermostat with temperature control means.

5782.4 g of Dynasylan® DAMO were initially charged and 2392 g of methanol were stirred in. The bottoms temperature increased from 21° C. to 38° C. Subsequently at a bottoms temperature of 58° C. to 60° C., 3291.6 g of benzyl chloride were added dropwise over about 6 hours and the mixture was stirred at 58° C. to 60° C. for a further 3 hours. Analysis of the bottoms sample showed a content of free benzyl chloride of <0.1% by weight. At a bottoms temperature of 25° C., 2382.1 g of conc. hydrochloric acid (w=37%) were added dropwise over 3 hours. At a bottoms temperature of 30° C. to 56° C. and an absolute pressure of 250 mbar to 152 mbar, altogether 8149 g of distillate were removed. DM water was added during the distillation. Yield: 14 670 g of clear yellowish liquid having an active substance content of 60% by weight.

| Determination | Result | Method |
| --- | --- | --- |
| Free methanol [%] | 0.2 | SAA 1844 |
| Colour number [Gardner] | <1 | ISO 6274 |
| Viscosity 20° C. [mPas] | 249.6 | DIN 53015 |
| Density (20° C.) [g/cm$^3$] | 1.167 | DIN 51757 |
| pH (10% in H$_2$O) | 3.3 | DIN 38409-H-1 |

Colour number: ≤1 Gardner after production
≤1 Gardner after 3 weeks of storage at 60° C.
≤1 Gardner after 6 weeks of storage at 60° C.

The invention claimed is:

1. An aqueous composition, comprising:
   an active substance comprising N-benzyl-substituted N-(2-aminoethyl)-3-aminopropylsiloxane hydrochlorides,
   wherein
   the composition after storage for 6 weeks at 60° C. has a color number of ≤1 Gardner,
   a content of methanol of ≤0.5% by weight,
   an active substance content of ≤60% by weight, and
   a content of water of ≥40% to ≤60% by weight, and
   wherein components in the composition sum to 100% by weight.

2. The composition according to claim 1, wherein the active substance comprises N-benzyl-substituted N-(2-aminoethyl)-3-aminopropylsiloxane hydrochlorides as a mixture of isomeric N-benzyl-substituted N-(2-aminoethyl)-3-aminopropylsiloxanes, wherein at least one of the isomeric N-benzyl-substituted N-(2-aminoethyl)-3-aminopropylsiloxanes conforms to formula (I):

$$HO_{(1-y)}(RO)_y[(A)SiO(OH)_{(1-z)}(OR)_z]_x—R \qquad (I),$$

wherein R represents methyl or ethyl,
x≥1,
y=0 or 1 and z=0 or 1,
with the proviso that (y+z)≤1, and
A represents an aminoalkyl group according to formula (II),

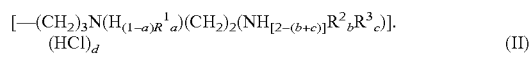

$$[—(CH_2)_3N(H_{(1-a)}R^1{}_a)(CH_2)_2(NH_{[2-(b+c)]}R^2{}_bR^3{}_c)]\cdot(HCl)_d \qquad (II)$$

where a=0 or 1,
b=0 or 1 or c=0 or 1,
with the proviso that (b+c)=0, 1, or 2,
wherein groups R$^1$, R$^2$, and R$^3$ represent benzyl, and
d=0, 1, 2, or 3,
wherein in at least one of the isomeric N-benzyl-substituted N-(2-aminoethyl)-3-aminopropylsiloxanes, d is 1, 2, or 3.

3. The composition according to claim 1, wherein the composition is storage-stable for at least 12 months at room temperature.

4. The composition according to claim 1, wherein the composition is storage-stable for at least 12 months at room temperature and has a color number of ≤1 Gardner, a viscosity of ≥50 to ≤300 mPas at 20° C., and a pH of ≥2 to ≤4.

5. A process for producing the composition according to claim 1, the process comprising:
   in a process variant A,
      in step 1 performing a controlled hydrolysis of N-(2-aminoethyl)-3-aminopropyltrimethoxysilane with 1.15 to 1.25 mol of water per mole of Si, at a temperature of from room temperature to 60° C., in the presence of 25% to 30% by weight of methanol based on present input materials N-(2-aminoethyl)-3-aminopropyltrimethoxysilane and water, to obtain a hydrolysate,
      immediately thereafter, in step 2, reacting the hydrolysate obtained in step 1 with benzyl chloride, at a temperature of 58° C. to 60° C. and subsequently adding hydrochloric acid, to obtain a product mixture, and
      subsequently, in step 3, distillatively removing methanol and any fractions likewise volatile under the distillation conditions, from the product mixture obtained in step 2 under reduced pressure and with addition of a defined amount of water, wherein water is simultaneously added to the distillation bottoms up to such an amount as volatile fractions are discharged overhead;
   or in a process variant B,
      initially charging an N—(N-benzyl-2-aminoethyl)-3-aminopropyltrimethoxysilane hydrochloride-comprising methanolic solution,
   adding hydrochloric acid in a weight ratio of N—(N-benzyl-2-aminoethyl)-3-aminopropyltrimethoxysilane hydrochloride to hydrochloric acid of 4 to 2:1, at a temperature of from room temperature to 60° C., over 20 to 40 minutes with commixing,
   quickly adding water in an amount of 1 to 2 mol of water per mole of N—(N-benzyl-2-aminoethyl)-3-aminopropyltrimethoxysilane hydrochloride, over 1 to 5 minutes with commixing, to obtain a product mixture, before
   distillatively removing volatile fractions from the product mixture at a temperature of 40° C. to 55° C. and a reduced pressure of 280 to 120 mbar, wherein water is simultaneously added to the distillation bottoms up to such an amount as volatile fractions are discharged overhead;
   to obtain in process variants A or B in the bottom of a distillation unit, an aqueous, low-VOC composition having an active substance content of ≤60% by weight, at a content of water of ≥40% to ≤60% by weight and a content of methanol of ≤0.5% by weight, wherein components in the composition sum to 100% by weight, and
   wherein the composition has a viscosity of ≥50 to ≤300 mPas at 20° C., a pH of ≥2 to ≤4 and a color number of ≤1 Gardner, and is storage-stable for at least 1 year at room temperature.

6. The process according to claim 5, comprising process variant A, wherein in process variant A, the process comprises in step 2, adding/employing the hydrochloric acid in an amount of 0.9 to 1.0 mol of HCl per mole of Si.

7. The process according to claim 5, comprising process variant A, wherein in process variant A, the process comprises in step 3, distillatively removing methanol and any fractions likewise volatile under the distillation conditions from the product mixture at an absolute pressure of 303 mbar to 111 mbar and a temperature of 43° C. to 51° C., and simultaneously adding water to the distillation bottoms up to such an amount as volatile fractions are discharged overhead.

8. An aqueous composition obtainable according to the of claim 5.

9. A method for modifying fillers, pigments, or inorganic surfaces, the method comprising:
combining the composition according to claim 1 as an adhesion promoter with fillers, pigments or inorganic surfaces.

10. The process according to claim 5, comprising process variant A, wherein in process variant A, the benzyl chloride is added at a ratio of 1 mol of benzyl chloride per mole of N-(2-aminoethyl)-3-aminopropyltrimethoxysilane.

11. The process according to claim 5, comprising process variant A, wherein in process variant A, the water added during the removing, by distillation, of methanol is in a ratio of 1.35 g of water per 1.0 g of the N-(2-aminoethyl)-3-aminopropyltrimethoxysilane used in the controlled hydrolysis.

12. A method for functionalizing polymers or for adjusting the hydrophilicity of polymers, the method comprising:
combining the composition according to claim 1 as an additive with polymers, in adhesives, sealing compositions, or fibre composite materials.

13. The method according to claim 12, wherein the polymers combined with the composition are selected from the group consisting of thermoplastics, thermosets, and elastomers.

14. A method comprising:
combining the composition according to claim 1 as an additive with polymers.

15. A method for preparing glass fibre applications, the method comprising:
combining the composition according to claim 1 as a constituent of an aqueous size into a glass fibre application.

16. The composition according to claim 1, wherein the active substance content is 40% to 60% by weight.

17. The composition according to claim 1, which is storage stable for greater than 8 weeks at 60° C.

18. A composition obtained by the process variant A according to claim 5.

19. A composition obtained by the process variant B according to claim 5.

20. Glass fiber functionalized with a composition according to claim 1.

* * * * *